United States Patent
Urakami

(10) Patent No.: US 11,190,692 B2
(45) Date of Patent: Nov. 30, 2021

(54) IMAGE CAPTURE APPARATUS AND CONTROL METHOD HAVING IMAGE STABILIZATION WHICH REDUCES PERIPHERAL LIGHT VARIATION

(71) Applicant: CANON KABUSHIKI KAISHA, Tokyo (JP)

(72) Inventor: Toshifumi Urakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/823,407

(22) Filed: Mar. 19, 2020

(65) Prior Publication Data

US 2020/0314343 A1 Oct. 1, 2020

(30) Foreign Application Priority Data

Mar. 25, 2019 (JP) .............................. JP2019-057088

(51) Int. Cl.
*H04N 5/232* (2006.01)
*H04N 5/225* (2006.01)
*H04N 5/235* (2006.01)

(52) U.S. Cl.
CPC ....... *H04N 5/23287* (2013.01); *H04N 5/2253* (2013.01); *H04N 5/2254* (2013.01); *H04N 5/235* (2013.01); *H04N 5/23245* (2013.01)

(58) Field of Classification Search
CPC ........... H04N 5/23248; H04N 5/23264; H04N 5/2328–23287; H04N 5/23245; H04N 5/235–2352; H04N 5/238; G03B 5/00; G03B 5/02; G03B 2205/00–0038; G02B 27/64; G02B 27/646
See application file for complete search history.

(56) References Cited

U.S. PATENT DOCUMENTS

| | | | |
|---|---|---|---|
| 7,639,933 B2 | 12/2009 | Seo et al. | |
| 7,826,732 B2 | 11/2010 | Enomoto | |
| 2006/0257128 A1 | 11/2006 | Ishito et al. | |
| 2006/0284495 A1 | 12/2006 | Seo et al. | |
| 2010/0135648 A1 | 6/2010 | Enomoto | |
| 2016/0261801 A1* | 9/2016 | Horikawa | H04N 5/23212 |
| 2019/0191089 A1* | 6/2019 | Kimura | G02B 7/10 |
| 2019/0230287 A1* | 7/2019 | Shingu | H04N 5/23258 |
| 2020/0162669 A1* | 5/2020 | Shirai | H04N 5/23258 |
| 2020/0358942 A1* | 11/2020 | Kimura | H04N 5/23209 |

FOREIGN PATENT DOCUMENTS

| | | |
|---|---|---|
| JP | 2004-048346 A | 2/2004 |
| JP | 2011-081417 A | 4/2011 |

OTHER PUBLICATIONS

Jun. 24, 2020 European Search Report in European Patent Appln. No. 20161743.8.

* cited by examiner

*Primary Examiner* — Paul M Berardesca
(74) *Attorney, Agent, or Firm* — Venable LLP

(57) ABSTRACT

An image capture apparatus having a correction function that corrects image burring by controlling a position of an image sensor is disclosed. The apparatus controls the correction function in accordance with one of a plurality of modes including a first and second modes. In the first mode, the image sensor can move in a first direction perpendicular to an optical axis of an imaging optical system within a first distance. In the second mode, when an aperture size of a diaphragm in the imaging optical system is greater than or equal to a predetermined value, the image sensor can move in the first direction within a second distance shorter than the first distance.

17 Claims, 5 Drawing Sheets

F I G. 4A
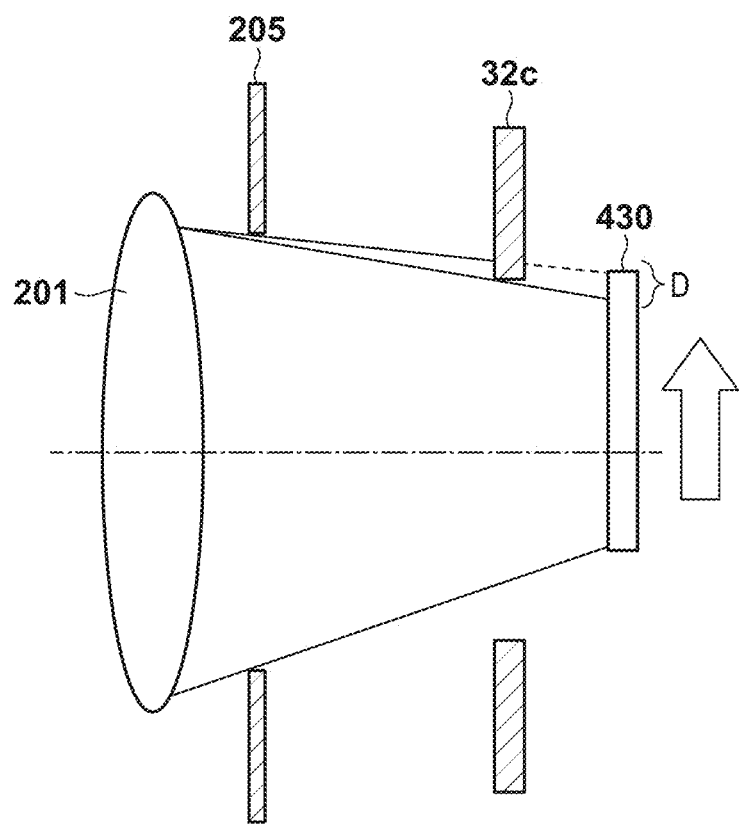
F I G. 4B
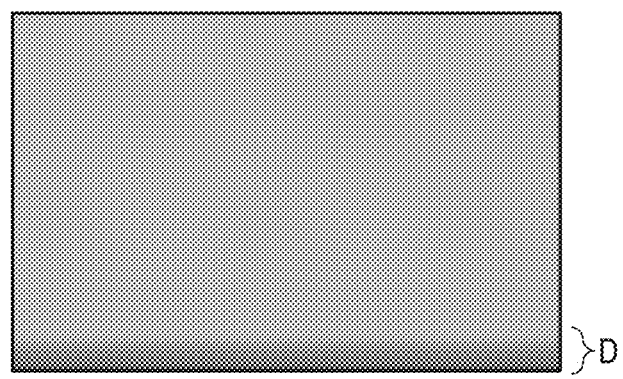

IMAGE CAPTURE APPARATUS AND CONTROL METHOD HAVING IMAGE STABILIZATION WHICH REDUCES PERIPHERAL LIGHT VARIATION

BACKGROUND OF THE INVENTION

Field of the Invention

The present invention relates to an image capture apparatus and a control method thereof, and particularly relates to an image capture apparatus in which the position of an image sensor is variable, and to a control method thereof.

Description of the Related Art

Japanese Patent Laid-Open No. 2011-81417 discloses an image capture apparatus that corrects image blurring by controlling the position of an image sensor in accordance with movement of the image capture apparatus.

With an image stabilization function that moves the image sensor, there are situations where, when there is an increased amount of movement of the image sensor, light that is supposed to be incident on the periphery of the image sensor is blocked by the shutter frame, causing the periphery areas of the image to become darker, particularly when the diaphragm is at or near the maximum aperture. Such light-fall-off in the periphery areas is particularly apparent when correcting image blurring while shooting a moving image, when a bright subject is present in the periphery areas, and so on.

This problem can be reduced by enlarging the opening in the shutter frame, but doing so increases the scale, weight, and so on of the shutter mechanism and, by extension, the image capture apparatus as a whole. Furthermore, the travel distance of the shutter curtain also increases, which increases the amount of power consumed and reduces the upper limit value of the shutter speed.

SUMMARY OF THE INVENTION

The present invention has been conceived in light of these problems with conventional techniques. One aspect of the present invention makes it possible, in an image capture apparatus capable of correcting image blurring by moving an image sensor and a method for controlling the image capture apparatus, to suppress light-fall-off in periphery areas of an image while using the image stabilization.

According to an aspect of the present invention, there is provided an image capture apparatus comprising: a correction circuitry that corrects image blurring by moving an image sensor in accordance with movement in the image capture apparatus, the image sensor capturing light from an imaging optical system; and one or more processors that execute a program to control the correction circuitry, wherein the one or more processors controls the correction circuitry in accordance with one of a plurality of modes, the modes including: a first mode in which the image sensor can move in a first direction perpendicular to an optical axis of the imaging optical system within a first distance; and a second mode in which, when an aperture size of a diaphragm in the imaging optical system is greater than or equal to a predetermined value, the image sensor can move in the first direction within a second distance shorter than the first distance.

According to another aspect of the present invention, there is provided a control method for an image capture apparatus, the apparatus including correction circuitry that corrects image blurring by moving an image sensor in accordance with movement in the image capture apparatus, the image sensor capturing light from an imaging optical system, and the method comprising: controlling operations of the correction circuitry in accordance with one of a plurality of modes, the modes including: a first mode in which the image sensor can move in a first direction perpendicular to an optical axis of the imaging optical system within a first distance; and a second mode in which, when an aperture size of a diaphragm in the imaging optical system is greater than or equal to a predetermined value, the image sensor can move in the first direction within a second distance shorter than the first distance.

According to a further aspect of the present invention, there is provided a non-transitory computer-readable medium that stores a program that causes, when executed by a computer included in an image capture apparatus that includes a correction circuitry that corrects image blurring by moving an image sensor in accordance with movement in the image capture apparatus wherein the image sensor captures light from an imaging optical system, the computer to carry out a control method for the image capture apparatus comprising: controlling operations of the correction circuitry in accordance with one of a plurality of modes, the modes including: a first mode in which the image sensor can move in a first direction perpendicular to an optical axis of the imaging optical system within a first distance; and a second mode in which, when an aperture size of a diaphragm in the imaging optical system is greater than or equal to a predetermined value, the image sensor can move in the first direction within a second distance shorter than the first distance.

Further features of the present invention will become apparent from the following description of embodiments with reference to the attached drawings.

BRIEF DESCRIPTION OF THE DRAWINGS

FIGS. 4A and 4B are vertical cross-sectional views schematically illustrating a state in which the image sensor is hidden by the shutter aperture.

DESCRIPTION OF THE EMBODIMENTS

Figure 1:
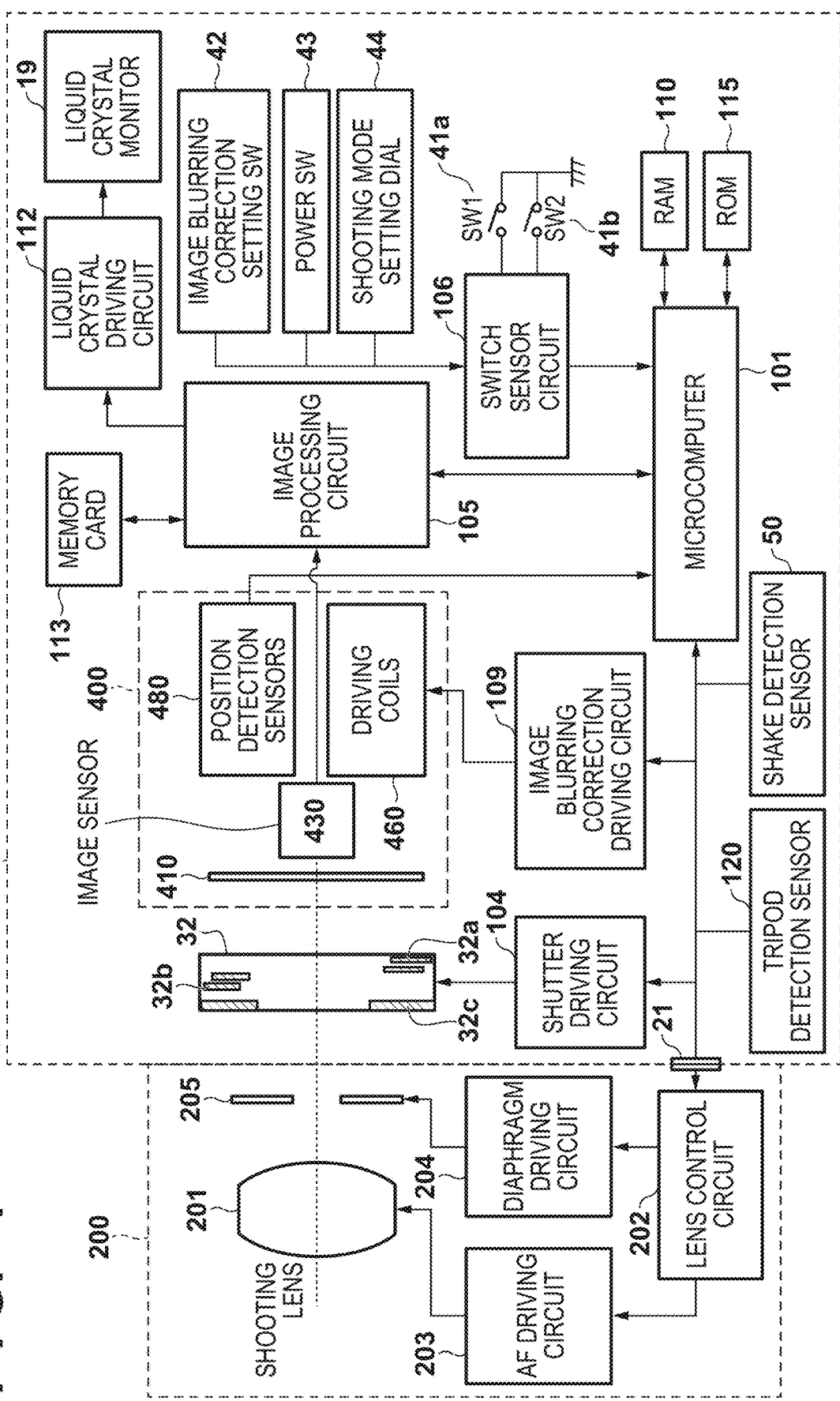
FIG. 1 is a block diagram illustrating an example of the functional configuration of a camera system according to embodiments of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Embodiments in which the present invention is applied in an interchangeable lens-type digital camera will be described hereinafter, but the present invention can be applied in any image capture apparatus having a focal plane shutter and capable of controlling the position of an image sensor, or in an electronic device including such an image capture apparatus.

First Embodiment

Camera System Configuration

FIG. 1 is a block diagram schematically illustrating an example of the functional configuration of a camera system according to a first embodiment. The camera system is constituted by a camera body (a digital camera 100) and a lens unit 200 which can be attached to and removed from the camera body.

A microcomputer ("MPU" hereinafter) 101 functions as a control unit that controls the operations of the various units in the digital camera 100 by loading programs stored in ROM 115 into RAM 110 and executing those programs. Also, by executing programs, the MPU 101 controls the operations of peripheral devices which can communicate with the digital camera 100 (the lens unit 200, a flash device, and so on). Unless otherwise specified, the operations carried out by the MPU 101 in the following descriptions are realized by the MPU 101 executing programs. The MPU 101 may actually be realized by a plurality of microprocessors.

The MPU 101 communicates with a lens control circuit 202 of the lens unit 200, and mount contact points 21. When the lens unit 200 is mounted to the digital camera 100, the mount contact points 21 of the digital camera 100 and the lens unit 200 make contact, and the digital camera 100 and the lens unit 200 are electrically connected as a result. The MPU 101 recognizes that communication with the lens control circuit 202 is possible by receiving a signal through the mount contact points 21.

The ROM 115 stores programs executed by the MPU 101, as well as various types of setting values, GUI data, and the like for the digital camera 100. As will be described later, in the present embodiment, the ROM 115 also stores information expressing a relationship between the f-number of a diaphragm in the lens unit and the aperture size, information of a relationship between the f-number and the maximum range of movement of an image sensor 430, and so on.

The RAM 110 is system memory used by the MPU 101 to load programs, temporarily store variables, and is also used as a data buffer.

The lens control circuit 202 drives a mobile lens included in a shooting lens 201 through an autofocus (AF) driving circuit 203, on the basis of control signals from the MPU 101. The shooting lens forms an imaging optical system of the digital camera 100. A focus lens is one of mobile lenses that the shooting lens 201 may include. Depending on the type of the lens unit 200, mobile lenses such as a magnifying lens, an anti-shake lens, and the like are also included. The lens control circuit 202 also drives a diaphragm 205 through a diaphragm driving circuit 204, on the basis of control signals from the MPU 101. Although only a single shooting lens 201 is illustrated in FIG. 1 for the sake of simplicity, the shooting lens 201 is actually constituted by a plurality of lens groups.

The image sensor 430 is a CMOS image sensor, for example, and has a plurality of photoelectric conversion elements arranged two-dimensionally. The image sensor 430 uses the photoelectric conversion elements to convert an optical image, formed by the shooting lens 201 on an imaging plane, into an electrical signal, and outputs that signal as an image signal. In the present embodiment, the image sensor 430 has a configuration in which a plurality of photoelectric conversion elements are shared by each of microlenses which constitute a microlens array. The MPU 101 can execute AF using the imaging plane phase difference detection method on the basis of the signals output from the image sensor 430. Note that the MPU 101 may execute AF using the contrast detection method on the basis of the signals output from the image sensor 430. The MPU 101 may also execute AF using a phase difference detection method by employing signals obtained from an AF sensor separate from the image sensor 430.

The MPU 101 transmits a defocus amount and a defocus direction obtained through the phase difference detection AF to the lens control circuit 202. The lens control circuit 202 controls the AF driving circuit 203 on the basis of the received defocus amount and direction, and moves the focus lens to an in-focus position.

The diaphragm driving circuit 204 controls the f-number (i.e., the opening diameter or opened amount) of the diaphragm 205 in accordance with control signals from the lens control circuit 202.

A shutter unit 32 is a mechanical focal plane shutter, and includes front curtain blades 32a, rear curtain blades 32b, and a frame-shaped shutter aperture 32c having a quadrangular opening that blocks unneeded stray light.

The front curtain blades 32a and the rear curtain blades 32b are fixed at an exposure position (a fully-open state) when not shooting, as well as when shooting a moving image. As such, the range of light beams entering in the direction of the image sensor 430 from the shutter unit 32 is limited by the opening in the shutter aperture 32c.

When shooting a still image, first, the front curtain blades 32a move from the exposure position to a light-blocking position, thus entering a shooting standby state. In this state, all of the light beams passing through the opening in the shutter aperture 32c are blocked by the front curtain blades 32a. The front curtain blades 32a then move from the light-blocking position to the exposure position, and the light beams passing through the shutter aperture 32c are incident on the image sensor 430 as a result.

The image sensor 430 accumulates a charge produced by the incident light beams in each of the photoelectric conversion elements. Once a set exposure time (shutter speed) has passed, the rear curtain blades 32b move from the exposure position to the light-blocking position, resulting in all of the light beams passing through the opening in the shutter aperture 32c being blocked by the rear curtain blades 32b; this ends the exposure period for one frame's worth of a still image. The charges accumulated by the photoelectric conversion elements during the exposure period are converted into voltages and then read out, and are processed as an image signal. The operations of the shutter unit 32 are controlled by a shutter driving circuit 104 on the basis of control commands from the MPU 101.

A shake detection sensor 50 outputs a signal expressing movement in the image capture apparatus. The shake detection sensor 50 may be an angular velocity sensor such as a gyrosensor, or an accelerometer, for example. The shake detection sensor 50 outputs, for example, signals (shake detection signals) expressing an angular velocity in each of a horizontal direction (an X direction, here) orthogonal to the optical axis of the lens unit 200, a vertical direction (a Y direction, here) orthogonal to the optical axis, and a direction of rotation about the optical axis (a roll direction). The shake detection signals are output to the MPU 101.

The MPU 101 determines a movement direction and movement amount of the image sensor 430 to correct image blurring on the basis of the shake detection signals. The MPU 101 then outputs a control signal based on the determined movement direction and movement amount to an image blurring correction driving circuit 109.

An image capturing unit 400 includes, in addition to the image sensor 430, an optical low-pass filter 410 that reduces high-frequency components in the light incident on the image sensor 430, position detection sensors 480 that detect the position of the image sensor 430, and driving coils 460 that control the position of the image sensor 430. The position detection sensors 480 and the driving coils 460 are parts of an image blurring correction mechanism.

The driving coils 460 are capable of moving the image sensor 430 in the X direction and the Y direction independently. Note that the range over which the image sensor 430 can be moved in each direction is, for example, mechanically limited to a predetermined range centered on a default position. By controlling the driving coils 460 in accordance with control signals from the MPU 101, the image blurring correction driving circuit 109 controls the position of the image sensor 430 to suppress image blurring caused by movement in the digital camera 100, and image blurring is corrected as a result.

The position detection sensors 480 include a Hall effect device or the like, detect displacement of the image sensor 430 in the X direction, the Y direction, and rotationally about the optical axis, and output position detection signals indicating the detection results to the MPU 101.

An image processing circuit 105 applies predetermined signal processing to image signals read out from the image sensor 430, and generates image data for display and/or recording. The image processing circuit 105 also outputs, to the MPU 101, information obtained by applying signal processing to the image data. The image processing circuit 105 may, for example, be a dedicated hardware circuit, such as an ASIC, designed to implement specific functions, or may be realized by a programmable processor, such as a DSP, which is configured to implement specific functions by executing software.

Here, the signal processing applied by the image processing circuit 105 includes preprocessing, color interpolation processing, correction processing, detection processing, data processing, evaluation value calculation processing, and so on. The preprocessing includes A/D conversion, noise removal, gain adjustment, missing pixel correction, and so on. Color interpolation processing is processing for interpolating the values of color components not included in the image data read out from the pixels, and is also called "demosaicing". The correction processing includes white balance adjustment, processing for correcting image luminance, processing for correcting optical aberration from a lens group 10, color correction processing, and so on. The detection processing includes processing for detecting and tracking a characteristic region (e.g., a face region or a human body region), processing for recognizing a person, and so on. The data processing includes scaling processing, encoding and decoding processing, header information generation processing, and so on. The evaluation value calculation processing is processing for calculating evaluation values used in automatic exposure control (AE) processing, AF processing, and so on carried out by the MPU 101. Note that these are merely examples of the signal processing which the image processing circuit 105 can carry out, and are not intended to limit the signal processing which the image processing circuit 105 carries out. Note that if the image sensor 430 has an A/D conversion function and outputs digital image data, A/D conversion carried out by the image processing circuit 105 is not necessary.

The image processing circuit 105 also executes processing for recording and playing back image data into and from a memory card 113. The recording processing also includes processing for generating a data file in a predetermined format, the data file holding the image data for recording.

A liquid crystal driving circuit 112 causes images to be displayed in a liquid crystal monitor 19 in accordance with the image data for display generated by the image processing circuit 105. As a result, the liquid crystal monitor 19 can be caused to function as an electronic viewfinder (EVF), caused to display images that have been shot, and so on.

A switch sensor circuit 106 detect signals from operation members in the digital camera 100, such as switches (SW), buttons, and so on, and outputs the detection results to the MPU 101. FIG. 1 illustrates a release SW 41 (41*a*, 41*b*), an image blurring correction setting SW 42, a power SW 43, and a shooting mode setting dial 44 as representative examples of the operation members, but the operation members are not limited thereto. The release SW 41 is a starting switch used when a user instructs the digital camera 100 to start shooting, and has a switch structure which is operated in steps. A first switch SW1 (41*a* in FIG. 1) turns on with a first stroke, and a second switch SW2 (41*b* in FIG. 1) turns on with a second stroke. The image blurring correction setting SW 42 is a setting switch for correcting image blurring. The power SW 43 is a switch for turning the power of the image capture apparatus on and off. The shooting mode setting dial 44 is a rotational operation member used to set a shooting mode.

Note that the present embodiment assumes that when the shooting mode setting dial 44 is set to a moving image shooting mode, moving images are shot by operating the release switch 41. However, a separate operation member for instructing moving image shooting to start and stop may be provided as well. Additionally, if the liquid crystal monitor 19 is a touch display, a switch sensor circuit 106 notifies the MPU 101 of a touch operation detection result.

A tripod detection unit 120 is constituted by a mechanical switch, a non-contact sensor, and the like, detects whether or not a tripod is attached to the digital camera 100, and outputs a result of the detection to the MPU 101.

Configuration of Image Capturing Unit 400

Figure 2:
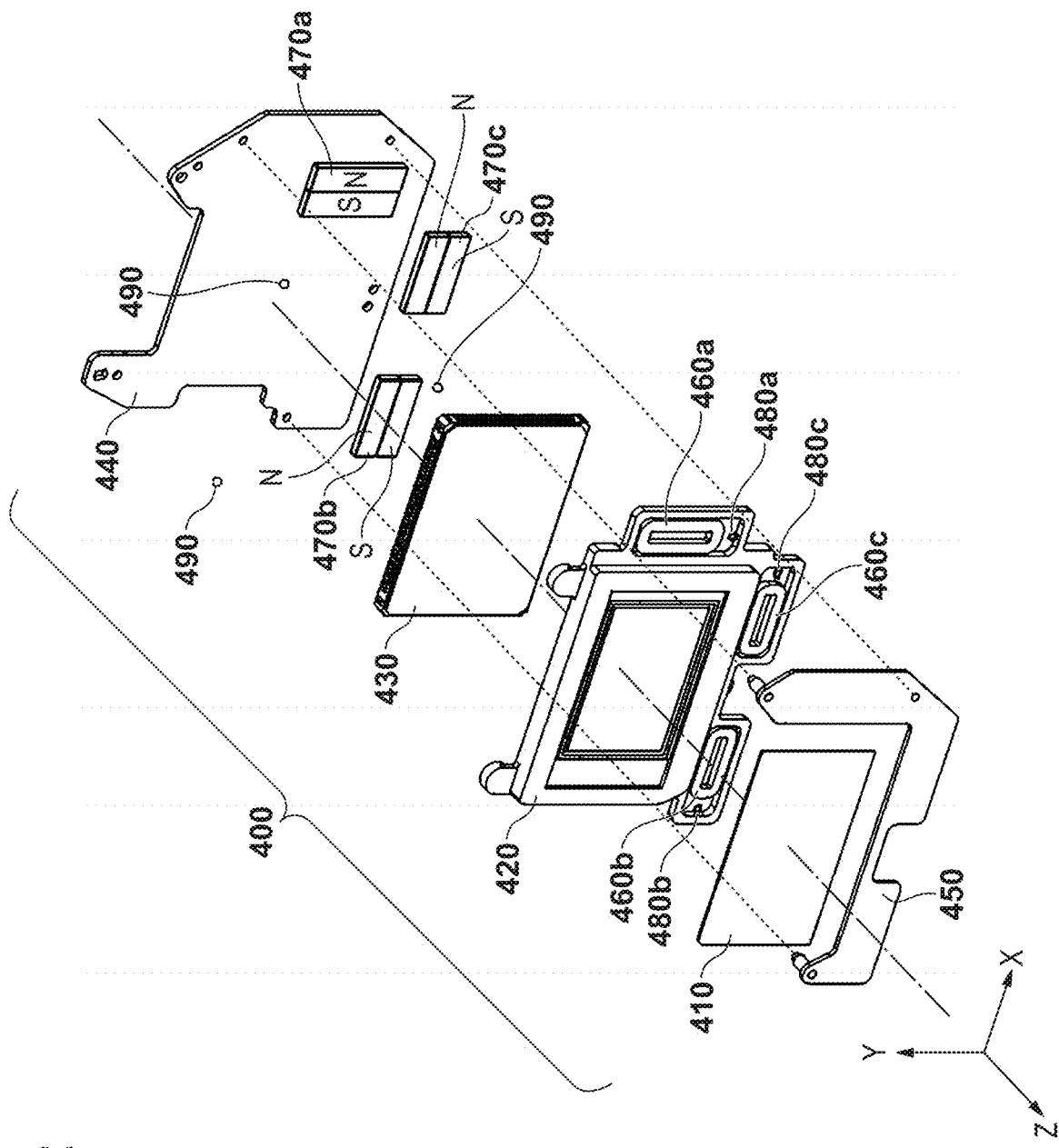
FIG. 2 is an exploded perspective view illustrating an example of the configuration of an image capturing unit, indicated in FIG. 1.

The configuration of the image capturing unit 400 will be described in further detail with reference to FIG. 2, which is an exploded perspective view of the image capturing unit 400. In FIG. 2, the optical axis of the lens unit 200 is denoted as a Z axis, an axis in the horizontal direction perpendicular to the Z axis is denoted as an X axis, and an axis in the vertical direction orthogonal to both the Z axis and the X axis is denoted as a Y axis. Note that the positive direction of the Z axis corresponds to a subject direction, and the negative direction of the Z axis corresponds to an image sensor direction. The following will describe the positional relationship in which the subject direction is toward the front and the image sensor direction is toward the rear.

The image capturing unit 400 holds the image sensor 430 in a mobile state in order to suppress image blurring. The optical low-pass filter 410 is, for example, a birefringent plate constituted by a crystal, and is disposed on the forward side of the image sensor 430. The surface of the optical low-pass filter 410 is subjected to a coating treatment in order to cut infrared rays, prevent reflection, and so on.

A shift holder 420 is a mobile member capable of moving in the X direction, the Y direction, and the roll direction, and holds the optical low-pass filter 410 and the image sensor 430. The image sensor 430 is fixed to the shift holder 420 by screws, an adhesive, or the like, for example.

A shift base 440 constitutes part of a base member of the image capturing unit 400, and is disposed on the rear side of the image sensor 430. A front base 450 is a member which is substantially L-shaped when viewed from the front, and is disposed on the side of the shift holder 420 opposite from the side on which the shift base 440 is disposed (i.e., the forward side). The shift base 440 and the front base 450 are formed from a soft magnetic material such as iron. Part of the front base 450 is linked to the shift base 440, and is integrated with the shift base 440. In other words, the shift base 440 and the front base 450 constitute the base member (fixing member) of the image capturing unit 400, and hold the shift holder 420 in a mobile state. The shift base 440 is fixed to the digital camera 100.

An X direction driving coil 460a and Y direction driving coils 460b and 460c are fixed to the shift holder 420. The X direction driving coil 460a and the Y direction driving coils 460b and 460c constitute the driving coil 460 illustrated in FIG. 1. The X direction driving coil 460a is disposed on the right side of the image sensor 430 when viewed from the front, so that the center of the coil is disposed along an XZ plane. The Y direction driving coils 460b and 460c are disposed on a lower side of the image sensor 430, symmetrically with respect to a YZ plane and with a predetermined gap between the coils in the X direction. Along with an X direction magnet 470a and Y direction magnets 470b and 470c, the X direction driving coil 460a and the Y direction driving coils 460b and 460c constitute an electromagnetic driving unit of the image capturing unit 400.

The X direction magnet 470a and the Y direction magnets 470b and 470c are fixed to a surface of the shift base 440 which opposes the front base 450. In the X direction magnet 470a, the N pole and the S pole are arranged in the X direction, whereas in the Y direction magnets 470b and 470c, the N pole and the S pole are arranged in the Y direction. The magnets 470a, 470b, and 470c are disposed opposing the driving coils 460a, 460b, and 460c, respectively. Specifically, the X direction driving coil 460a is always positioned within the magnetic field of the X direction magnet 470a. Viewed from the positive direction of the Z axis, a right side part of the driving coil 460a always overlaps with the N pole of the X direction magnet 470a, and a left side part of the driving coil 460a always overlaps with the S pole of the X direction magnet 470a. Likewise, the Y direction driving coil 460b is always positioned within the magnetic field of the Y direction magnet 470b. Viewed from the positive direction of the Z axis, an upper side part of the driving coil 460b always overlaps with the N pole of the magnet 470b, and a lower side part of the driving coil 460b always overlaps with the S pole of the magnet 470b. Likewise, the Y direction driving coil 460c is always positioned within the magnetic field of the Y direction magnet 470c. Viewed from the positive direction of the Z axis, an upper side part of the driving coil 460c always overlaps with the N pole of the magnet 470c, and a lower side part of the driving coil 460c always overlaps with the S pole of the magnet 470c.

The image blurring correction driving circuit 109 can supply power to the X direction driving coil 460a and the Y direction driving coils 460b and 460c independently. When current flows in the X direction driving coil 460a, a magnetic flux produced by the driving coil 460a and a magnetic flux produced by the X direction magnet 470a interfere magnetically, which produces Lorentz force. As a result, the shift holder 420 attempts to move linearly in the X direction relative to the shift base 440, with the Lorentz force produced by the electromagnetic driving unit acting as thrust (driving force). Specifically, when current flows in the X direction driving coil 460a, clockwise when viewed from the positive direction of the Z axis, a force acting in the −X direction (the left direction) arises in both the right side part and left side part of the driving coil 460a. Additionally, when current flows in the X direction driving coil 460a, counter-clockwise when viewed from the positive direction of the Z axis, a force acting in the +X direction (the right direction) arises in both the right side part and left side part of the driving coil 460a.

In other words, the shift holder 420 can be moved linearly in the X direction (the left and right directions) by using the image blurring correction driving circuit 109 to adjust the current flowing in the X direction driving coil 460a. The Lorentz force is substantially proportional to the magnitude of the coil current, and thus increasing the current flowing in the X direction driving coil 460a increases the thrust in the X direction. Accordingly, the shift holder 420 can be moved in the X direction at a speed based on the speed of hand shake or the like in the X direction, by using the image blurring correction driving circuit 109 to adjust the magnitude of the current flowing in the X direction driving coil 460a.

Likewise, when current flows in the Y direction driving coils 460b and 460c, clockwise when viewed from the positive direction of the Z axis, a force acting in the −Y direction (the downward direction) arises in both the upper side parts and lower side parts of the driving coils 460b and 460c. Additionally, when current flows in the Y direction driving coils 460b and 460c, counter-clockwise when viewed from the positive direction of the Z axis, a force acting in the +Y direction (the upward direction) arises in both the upper side parts and lower side parts of the driving coils 460b and 460c. In other words, the shift holder 420 can be moved linearly in the Y direction (the up and down directions) by using the image blurring correction driving circuit 109 to set the currents supplied to the Y direction driving coils 460b and 460c to the same magnitude and adjusting the directions of the currents.

Furthermore, different Y direction thrusts can be produced in the driving coils 460b and 460c, so as to rotate the shift holder 420 about the Z axis, by setting the currents supplied to the Y direction driving coils 460b and 460c to different magnitudes. The speed at which the shift holder 420 moves in the Y direction and the rotation direction can be controlled using the magnitudes of the currents supplied to the Y direction driving coils 460b and 460c. Accordingly, the shift holder 420 can be moved in the Y direction, the rotation direction, and so on at a speed based on the speed of hand shake or the like in the Y direction, by using the image blurring correction driving circuit 109 to adjust the magnitude of the current flowing in the Y direction driving coils 460b and 460c. The driving coils 460a to 460c and the magnets 470a to 470c constitute an image sensor driving mechanism.

The position detection sensor 480a is provided in a position near the X direction driving coil 460a of the shift holder 420, opposing the magnetization boundary of the X direction magnet 470a. The position detection sensor 480a is, for example, a Hall effect device, and outputs an electrical signal based on changes in a magnetic flux received from the X direction magnet 470a. Accordingly, displacement of the shift holder 420 (including the members fixed to the shift holder 420, such as the image sensor 430) in the X direction can be detected on the basis of the output from the position detection sensor 480a.

Additionally, the position detection sensors 480b and 480c are provided in positions near the Y direction driving coils 460b and 460c of the shift holder 420, opposing the magnetization boundaries of the Y direction magnets 470b and 470c, respectively. The position detection sensors 480b and 480c are, for example, Hall effect devices, and output electrical signals based on changes in magnetic fluxes received from the Y direction magnets 470b and 470c, respectively. Accordingly, displacement of the shift holder 420 (including the members fixed to the shift holder 420, such as the image sensor 430) in the Y direction, a rotation amount and direction about the Z axis, and so on can be detected on the basis of the outputs from the position detection sensors 480b and 480c.

Note that as illustrated in FIG. 2, the position detection sensor 480b is disposed to the left of the Y direction driving coil 460b, and the position detection sensor 480c is disposed to the right of the Y direction driving coil 460c. Accordingly, more distance can be provided between the position detection sensors 480b and 480c than if the position detection sensor 480b were disposed to the right of the Y direction driving coil 460b and the position detection sensor 480c to the left of the Y direction driving coil 460c. The difference between the outputs of the position detection sensors 480b and 480c per amount of rotation in the shift holder 420 can therefore be increased, which in turn makes it possible to accurately detect the amount of rotation of the shift holder 420 and ultimately improves the accuracy with which rotational shake can be corrected.

A plurality of balls 490 (three, in the example illustrated in FIG. 2) contact both the shift holder 420 and the shift base 440, and are held in a mobile state. By interposing the balls 490 between the shift holder 420 and the shift base 440, the shift holder 420 moves within a plane parallel to the shift base 440.

Image Blurring Correction Operations

Image blurring correction operations carried out using the image capturing unit 400 will be described next. The image blurring correction operations are operations for moving the image sensor 430 opposite from movement of the digital camera 100. The image blurring correction operations are executed when an image blurring correction function is set to "on" (active) by the image blurring correction setting SW 42.

The MPU 101 integrates the output signals from the shake detection sensor 50, and calculates angular shake amounts in each direction (here, the X direction, the Y direction, and the direction about the optical axis (the roll direction)). The MPU 101 then determines target values for controlling the movement of the image sensor 430, which is required to suppress image blurring, on the basis of the angular shake amounts. These target values may be movement target positions in the X direction, the Y direction, and the roll direction. The MPU 101 outputs control signals, for moving the image sensor 430 to the target positions, to the image blurring correction driving circuit 109. In accordance with the control signals from the MPU 101, the image blurring correction driving circuit 109 controls the magnitudes and directions of the currents supplied to the X direction driving coil 460a and the Y direction driving coils 460b and 460c, and moves the image sensor 430 to the target positions.

The MPU 101 detects the position (X direction displacement, Y direction displacement, and rotational displacement in the roll direction) of the shift holder 420 (the image sensor 430) on the basis of output signals from the position detection sensors 480a to 480c. The MPU 101 compares the detected positions in each direction for the shift holder 420 with the target positions, and outputs, to the image blurring correction driving circuit 109, control signals specifying movement amounts and movement directions for reducing differences between the two. Image blurring correction which tracks movement of the digital camera 100 is realized by continuously executing this type of feedback control.

Note that known techniques can be used to determine the target movement positions (movement amounts and movement directions) on the basis of the angular shake amount, move the image sensor to the target positions using the feedback control, and so on, and thus these operations will not be described in any further detail.

Light-Fall-Off in Peripheral Areas Due to Shake Correction

Figure 3A:
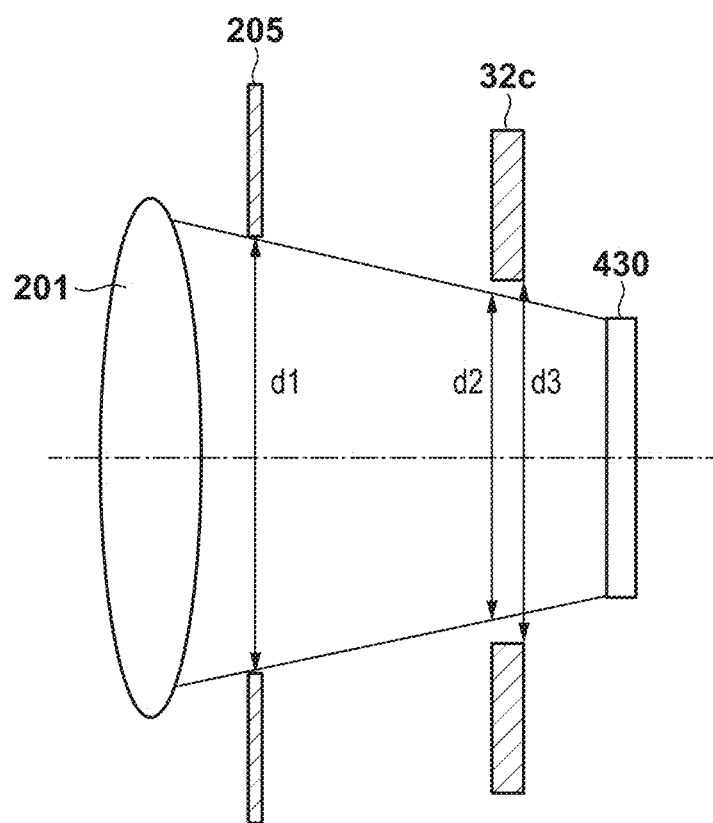
FIGS. 3A and 3B are vertical cross-sectional views schematically illustrating a state in which an image sensor is not hidden by a shutter aperture.

A phenomenon in which movement of the image sensor in the image blurring correction operations causes light-fall-off in periphery areas of a shot image will be described with reference to FIGS. 3A to 4B. FIG. 3A is a cross-sectional view, taken along the YZ plane, schematically illustrating a range in which light beams are incident on the image sensor 430 from the lens unit 200 in the camera system according to the present embodiment.

Light beams that have passed through the shooting lens 201 are restricted by the aperture in the diaphragm 205 and the opening in the shutter aperture 32c, and are then incident on the image sensor 430. An aperture size d1 of the diaphragm 205 is variable, and increases as the f-number decreases. As the aperture size d1 increases, a range d2 of incident light on the shutter aperture 32c also increases. Because a size d3 of the opening in the shutter aperture 32c is fixed, the difference between d2 and d3 decreases as the f-number of the diaphragm 205 decreases.

Figure 3B:
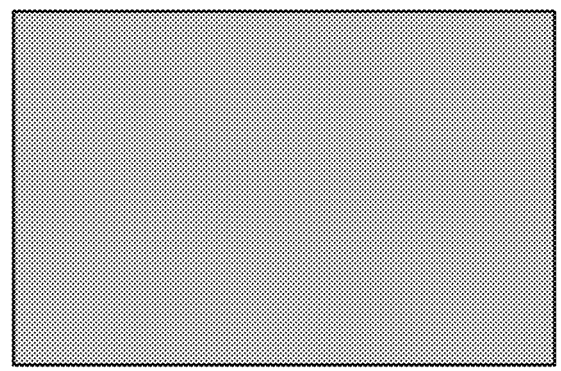

The opening in the shutter aperture 32c is designed to have a size such that when the center of the image sensor 430 intersects with the optical axis as in FIG. 3A, no light is blocked by the shutter aperture 32c (i.e., the image sensor 430 is not hidden) even when the diaphragm 205 is at maximum aperture. Thus even when the f-number of the diaphragm 205 is low, the periphery areas in the image obtained by the image sensor 430 will not be dark (FIG. 3B).

However, when the center of the image sensor 430 is shifted away from the optical axis due to image blurring correction operations, if there is a particularly large amount of movement, as indicated in FIG. 4A, pixels of the image sensor 430 located in the periphery areas (the range indicated by D in FIG. 4A) will be hidden behind the frame part around the opening in the shutter aperture 32c, causing a drop in the incident light. FIG. 4B schematically illustrates a luminance distribution in an image obtained from the state illustrated in FIG. 4A. This problem can be reduced by making the opening in the shutter aperture 32c larger. However, making the opening in the shutter aperture 32c also increases the size of the shutter unit. Furthermore, the increased travel distance for the blades means it is necessary to drive the blades at a correspondingly higher speed, which also results in an increased size for the driving mechanism.

This phenomenon is more likely to arise with lower f-numbers, and with higher amounts of movement in the image sensor 430, and the range D broadens as well. The phenomenon is also more noticeable when the subject appearing in the range D has a uniform luminance. The phenomenon is more noticeable in moving images than in still images. This is because changes over time in the range, extent, and so on of the phenomenon are more easily recognizable as flicker or the like in moving images.

Thus in the present embodiment, a second image blurring correction mode (an image quality priority mode) and a first image blurring correction mode (a correction priority mode) can be selected, the second image blurring correction mode limiting the range of movement of the image sensor 430 during image blurring correction to a range at which the brightness in the periphery areas of an image does not decrease or decreases less, and the first image blurring correction mode not imparting such a limitation. When the correction priority mode is set as the image blurring correction mode, the MPU 101 carries out the image blurring correction operations in the same manner as in the past.

More generally speaking, the second image blurring correction mode limits the movement range or movement distance of the image sensor in a first direction perpendicular to the optical axis of an imaging optical system to a range (distance) that is smaller than the maximum movement range or movement distance in the first image blurring correction mode. Here, with respect to the first image blurring correction mode, the movement range will be called a "first range" and the movement distance will be called a "first distance". Likewise, with respect to the second image blurring correction mode, the movement range will be called a "second range" and the movement distance will be called a "second distance". Note that the maximum values of the first range and the first distance are determined by mechanical restrictions.

When the image quality priority mode is set as the image blurring correction mode, the MPU 101 determines the maximum range of movement of the image sensor 430 according to the current f-number, on the basis of information expressing a relationship between the f-number and aperture size in the lens unit 200 which is mounted. The maximum range of movement of the image sensor 430 is a range at which the brightness of the periphery areas of an image obtained by the image sensor 430 does not drop, or does drop but not as much as when in the correction priority mode. The MPU 101 then sets the detected movement target position for the image sensor 430 to a position that does not exceed the maximum range of movement, and executes the image blurring correction operations. As one example, the following will describe a situation in which the maximum range of movement of the image sensor 430 in the image quality priority mode is set to a range at which the brightness of the periphery areas of an image obtained by the image sensor 430 does not drop.

The MPU 101 can obtain the information expressing the relationship between the f-number and the aperture size of the mounted lens unit 200 from the lens control circuit 202 when the lens unit 200 is mounted to the digital camera 100. Alternatively, or furthermore, the information expressing the relationship between the f-number and the aperture size can be stored in the ROM 115 in association with model information of the lens unit. In this case, the MPU 101 obtains the model information from the lens control circuit 202 when the lens unit 200 is mounted to the digital camera 100. The MPU 101 can then refer to the ROM 115 on the basis of the obtained model information, read out the corresponding information expressing the relationship between the f-number and the aperture size to the RAM 110, and use that information. Note that these methods are merely examples, and the information expressing the relationship between the f-number and the aperture size of the mounted lens unit 200 may be obtained through another method, such as obtaining the information from an external device.

Additionally, the maximum range of movement corresponding to the aperture size of the diaphragm can be stored in the ROM 115, as a function that takes the aperture size as a variable, or by associating a plurality of discrete aperture sizes with the maximum range of movement. In the latter case, aperture sizes not stored can be found by interpolating values which are stored. Note that rather than finding the aperture size from the f-number and then finding the maximum range of movement from the aperture size, the f-number and the maximum range of movement may be associated directly and stored for each lens unit model, for example. Note also that the maximum range of movement can be defined by a maximum value for each direction from a reference position (a position in a state where the image sensor 430 has not moved), for example.

With image blurring correction operations in the image quality priority mode, the image sensor 430 moves in a range at which the sensor is not hidden by the shutter aperture 32c, and thus the brightness of the periphery areas of the image does not vary. However, the maximum correctable value of the image blurring is lower than when in the correction priority mode.

Note that the image blurring correction mode may be explicitly selected (set) by the user, or may be set automatically by the MPU 101 in accordance with shooting conditions, the subject, and so on. For example, a configuration is possible in which the user can select whether to set the correction priority mode or the image quality priority mode when the image blurring correction operations have been turned on (activated) by the image blurring correction setting SW 42.

The image quality priority mode can also be set automatically in the following cases, for example.
 when the lens unit 200 has an image stabilization function
 when the moving image shooting mode is set, or when shooting a moving image
 when it is determined, using scene determination, that there is sky in the periphery areas
 when it is determined that the subject luminance is high and the contrast is low in the periphery areas of the field of view (when the determination can be made on the basis of pre-set conditions)
 when a "manual exposure (M) mode" has been selected as the shooting mode
 when the focal distance of the lens unit is greater than or equal to a predetermined threshold (e.g., greater than or equal to 200 mm) (because the movement of the image sensor 430 produces a smaller image blurring correction effect)
 when the relationship between the f-number of the lens unit and the aperture size of the diaphragm is unknown The correction priority mode can also be set automatically in the following cases, for example.
 when the subject distance is less than a threshold distance, or when a macro shooting mode is set
 when the shutter speed is lower than a threshold
 when an "automatic settings (Auto) mode" is selected as the shooting mode
 when the focal distance of the lens unit is less than or equal to a predetermined threshold (e.g., 35 mm)
 when the tripod detection unit 120 has determined that the digital camera 100 is attached to a tripod These are merely examples, and the configuration may be such that the image blurring correction mode is set automatically under other conditions. Additionally, the conditions given as examples here can be selected and used as appropriate, and conditions may be used in combination with each other, and the conditions may be given priority rankings. For example, in a situation where conditions for automatically setting the image quality priority mode and conditions for automatically setting the correction priority mode can be satisfied at the same time, the mode to be given priority can be set. Additionally, the user can set the image blurring correction mode to be used when the relationship between the f-number of the lens unit and the aperture size of the diaphragm is unknown in advance as variable information.

Figure 5:
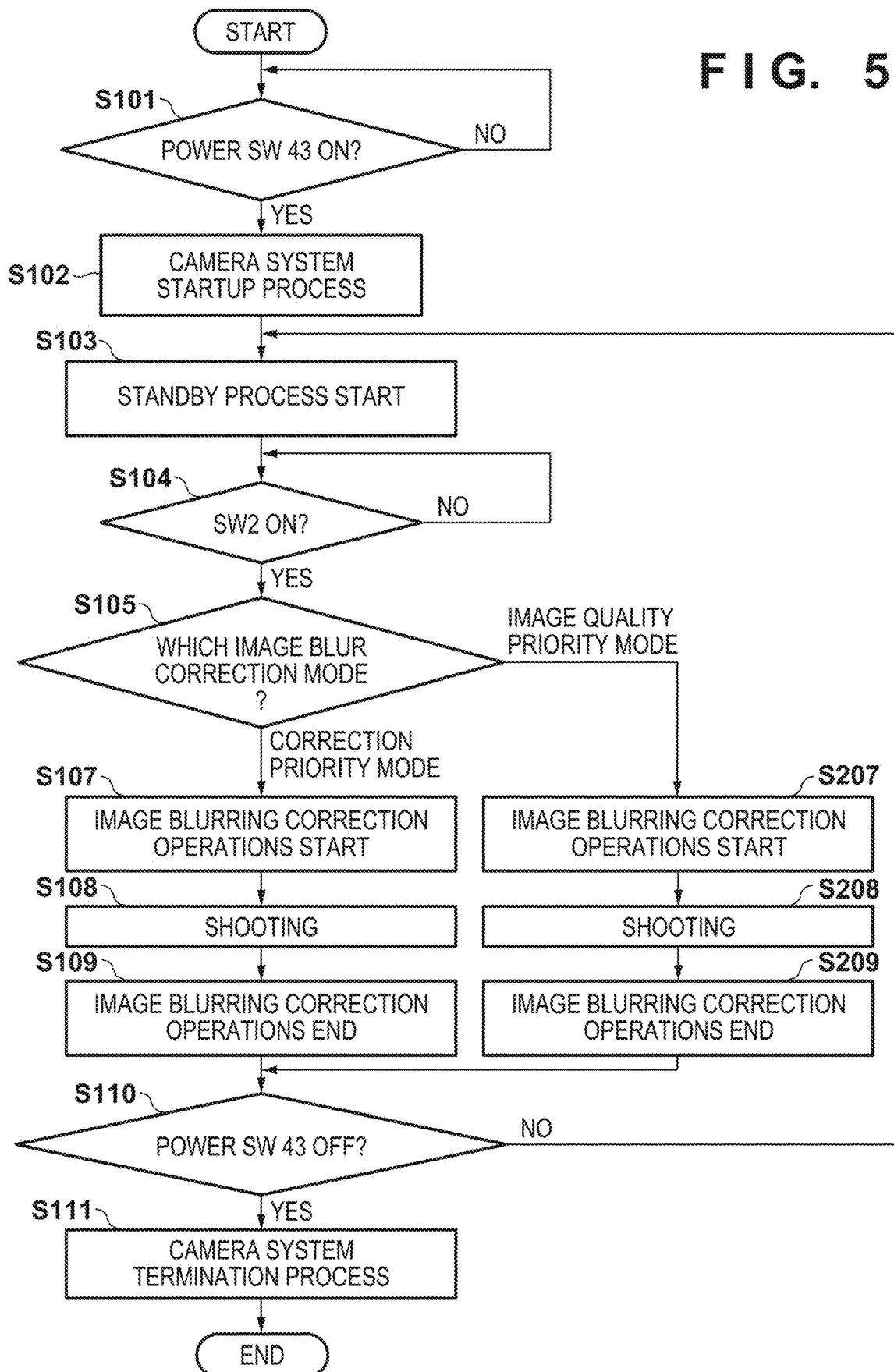
FIG. 5 is a flowchart illustrating operations carried out by a digital camera according to embodiments.

Operations carried out by the digital camera 100 when image blurring correction is set to active (on) will be described with reference to the flowchart in FIG. 5.

In step S101, the MPU 101 determines whether or not the power SW 43 has been turned on, on the basis of an output from the switch sensor circuit 106. The MPU 101 repeats the determination process of step S101 until it is determined that the power SW 43 has been turned on. Once it is determined that the power SW 43 has been turned on, the MPU 101 moves the process to step S102.

In step S102, the MPU 101 executes a camera system startup process. The MPU 101 supplies power to the various circuits from a power source, and makes initial settings, executes an operation check process, and so on. During the startup process, the MPU 101 communicates with the lens control circuit 202 of the mounted lens unit 200, and obtains information pertaining to the relationship between the f-number of the lens unit 200 and the aperture size of the diaphragm, the model information, and so on. Using information obtained by referring to the ROM 115, the MPU 101 finds the f-number of the lens unit 200, and the corresponding maximum range of movement of the image sensor 430 during the image blurring correction process in the image quality priority mode, and stores those items in the RAM 110.

Once the startup process ends, in step S103, the MPU 101 starts executing a standby process. The standby process is a process for causing the liquid crystal monitor 19 to function as an EVF. The MPU 101 fixes the front curtain blades 32a and the rear curtain blades 32b of the shutter unit 32 to the exposure position. The MPU 101 also drives the image sensor 430 in the moving image shooting mode to shoot frame images in a continuous manner. The MPU 101 then causes the image processing circuit 105 to generate a moving image for display, and causes the generated moving image to be displayed in the liquid crystal monitor 19 through the liquid crystal driving circuit 112.

While executing the standby process, in step S104, the MPU 101 determines whether or not the SW2 41b of the release SW 41 has turned on. When it is determined that the SW2 41b is on, the MPU 101 moves the process to step S105. However, if it is not determined that the SW2 41b is on, the MPU 101 continuously executes the standby process while monitoring the state of the SW2 41b.

In step S105, the MPU 101 sets the image blurring correction mode on the basis of conditions such as those described above. If subject information is needed to set the image blurring correction mode, a result of the image processing circuit 105 analyzing the frame images of the moving image shot during the standby process can be used. The MPU 101 moves the process to step S107 if the correction priority mode has been set, and to step S207 if the image quality priority mode has been set.

In step S107, the MPU 101 starts image blurring correction operations in the correction priority mode. The MPU 101 determines a movement direction and movement amount for the image sensor 430 which cancel out the movement of the digital camera 100 detected on the basis of output signals from the shake detection sensor 50. In the correction priority mode, the MPU 101 determines the target position for the image sensor 430, within the physical maximum range of movement of the image sensor 430, generates corresponding control signals, and outputs the signals to the image blurring correction driving circuit 109.

On the other hand, in step S207, the MPU 101 starts image blurring correction operations in the image quality priority mode. The MPU 101 refers to the RAM 110 using the aperture value (f-number) currently set, and obtains the corresponding maximum range of movement. Then, the MPU 101 determines the target position for the image sensor 430, within a maximum range of movement that is based on the aperture value and is narrower than the physical maximum range of movement of the image sensor 430, generates corresponding control signals, and outputs the signals to the image blurring correction driving circuit 109.

In steps S108 and S208, the MPU 101 carries out a shooting process and a recording process. In the present embodiment, if the moving image shooting mode is set, the MPU 101 carries out a shooting process and a recording process for moving images, whereas if the still image shooting mode is set, the MPU 101 carries out a shooting process in a recording process for still images. The shooting processes and recording processes for moving images and still images can be executed on the basis of known techniques, and will therefore not be described in detail here.

The MPU 101 continuously executes the image blurring correction operations, the shooting process, and the recording process until the shooting ends. Once the shooting ends, the MPU 101 ends the image blurring correction operations in steps S109 and S209.

In step S110, the MPU 101 determines whether or not the power SW 43 has been turned off, in the same manner as in step S101. If it is determined that the power SW 43 has been turned off, the MPU 101 moves the process to step S111, whereas if it is not determined that the power SW 43 has been turned off, the MPU 101 returns the process to step S103 and resumes the standby process.

In step S111, the MPU 101 executes a predetermined termination process (shutdown process), such as storing necessary information in the ROM 115. The MPU 101 may store information newly obtained from the lens unit 200 in the ROM 115 during the termination process. At the end of the termination process, the MPU 101 cuts off the supply of power to the various circuits.

According to the present embodiment as described thus far, in an image capture apparatus that corrects image blurring by moving an image sensor in accordance with movement in the image capture apparatus, an image blurring correction mode is provided which prioritizes image quality by limiting the movement range of the image sensor to a range at which the brightness of periphery areas of an image drops less. Accordingly, shooting which uses image blurring correction can be carried out while also suppressing both an increase in the size of a shutter mechanism, and a drop in the brightness of periphery areas of an image caused by the image blurring correction operations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2019-057088, filed on Mar. 25, 2019, which is hereby incorporated by reference herein in its entirety.

What is claimed is:

1. An image capture apparatus comprising:
   a correction circuitry that corrects image blurring by moving an image sensor in accordance with movement in the image capture apparatus, the image sensor capturing light from an imaging optical system; and
   one or more processors that execute a program to control the correction circuitry,
   wherein the one or more processors controls the correction circuitry in accordance with one of a plurality of modes, the modes including:
   (1) a first mode in which the image sensor can move in a first direction perpendicular to an optical axis of the imaging optical system within a first distance, wherein the first distance is independent from an aperture size of the imaging optical system; and
   (2) a second mode in which, when the aperture size is greater than or equal to a predetermined value, the image sensor can move in the first direction within a second distance shorter than the first distance,
   wherein the one or more processors further automatically sets the one of the plurality of modes on the basis of information pertaining to at least one of (i) whether a moving image shooting mode or a still image shooting mode is set to the image capture apparatus and (ii) a subject luminance in periphery areas of a field of view.

2. The image capture apparatus according to claim 1, wherein a maximum value of a difference between a light amount at a minimum image height and a light amount at a maximum image height in the second mode is less than the maximum value of the difference between a light amount at the minimum image height and a light amount at the maximum image height in the first mode.

3. The image capture apparatus according to claim 1, wherein the one or more processors determines the second distance in accordance with the aperture size.

4. The image capture apparatus according to claim 1, further comprising:
   a memory that stores information expressing a relationship between the aperture size and the second distance, wherein the one or more processors determines the second distance by referring to the memory using the set aperture size.

5. The image capture apparatus according to claim 4, wherein the information is information expressing a relationship between an f number of the diaphragm corresponding to the aperture size and the second distance.

6. The image capture apparatus according to claim 4, wherein on the basis of information expressing a relationship between an f number of the diaphragm and the aperture size and an f number being set, the one or more processors obtains an aperture size corresponding to the f number being set.

7. The image capture apparatus according to claim 1, wherein the one or more processors automatically sets the second mode as the one of the plurality of modes when shooting a moving image.

8. The image capture apparatus according to claim 1, wherein the one or more processors automatically sets the second mode as the one of the plurality of modes when it has been determined that a subject luminance is higher than a predetermined luminance value and a contrast is lower than a predetermined contrast value in periphery areas of a field of view.

9. The image capture apparatus according to claim 1, wherein the one or more processors automatically sets the first mode as the one of the plurality of modes when it has been determined that a tripod is attached to the image capture apparatus.

10. The image capture apparatus according to claim 1, wherein the one or more processors automatically sets the second mode as the one of the plurality of modes when a focal distance of the imaging optical system is greater than or equal to a threshold.

11. A control method for an image capture apparatus, the apparatus including correction circuitry that corrects image blurring by moving an image sensor in accordance with movement in the image capture apparatus, the image sensor capturing light from an imaging optical system, and the method comprising:
   controlling operations of the correction circuitry in accordance with one of a plurality of modes, the modes including:
   (1) a first mode in which the image sensor can move in a first direction perpendicular to an optical axis of the imaging optical system within a first distance, wherein the first distance is independent from an aperture size of a diaphragm of the imaging optical system; and
   (2) a second mode in which, when the aperture size is greater than or equal to a predetermined value, the image sensor can move in the first direction within a second distance shorter than the first distance,
   wherein the one of the plurality of modes is automatically set on the basis of information pertaining to at least one of (i) whether a moving image shooting mode or a still image shooting mode is set to the image capture apparatus and (ii) a subject luminance in periphery areas of a field of view.

12. The control method according to claim 11, wherein a maximum value of a difference between a light amount at a minimum image height and a light amount at a maximum image height in the second mode is less than the maximum value of the difference between a light amount at the minimum image height and a light amount at the maximum image height in the first mode.

13. A non-transitory computer-readable medium that stores a program that causes, when executed by a computer included in an image capture apparatus that includes a correction circuitry that corrects image blurring by moving an image sensor in accordance with movement in the image capture apparatus wherein the image sensor captures light from an imaging optical system, the computer to carry out a control method for the image capture apparatus, the control method comprising:

controlling operations of the correction circuitry in accordance with one of a plurality of modes, the modes including:

(1) a first mode in which the image sensor can move in a first direction perpendicular to an optical axis of the imaging optical system within a first distance, wherein the first distance is independent from an aperture size of a diaphragm of the imaging optical system; and (2) a second mode in which, when the aperture size is greater than or equal to a predetermined value, the image sensor can move in the first direction within a second distance shorter than the first distance, wherein the one of the plurality of modes is automatically set on the basis of information pertaining to at least one of (i) whether a moving image shooting mode or a still image shooting mode is set to the image capture apparatus and (ii) a subject luminance in periphery areas of a field of view.

14. The image capture apparatus according to claim 1, wherein the second distance can reduce a drop in the luminance in periphery areas in an image obtained by the image sensor due to a movement of the image sensor as compared to the drop that occurs when the image sensor moves in the first distance in the first mode.

15. The image capture apparatus according to claim 1, wherein the first mode is a stabilization priority mode, and wherein the second mode is an image quality priority mode.

16. The control method according to claim 11, wherein the second distance can reduce a drop in the luminance in periphery areas in an image obtained by the image sensor due to a movement of the image sensor as compared to the drop that occurs when the image sensor moves in the first distance in the first mode.

17. The control method according to claim 11, wherein the first mode is a stabilization priority mode and the second mode is an image quality priority mode.

* * * * *